United States Patent [19]
Beer et al.

[11] Patent Number: 6,038,618
[45] Date of Patent: Mar. 14, 2000

[54] BYPASS CIRCUIT FOR BYPASSING HOST COMPUTER WHICH ARE CONNECTED TO PLURALITY OF DEVICES VIA TWO INDIVIDUAL PORTS UPON DETECTING LACK OF COMMUNICATION AT BOTH PORTS

[75] Inventors: Reginald Beer, Eastleigh; Peter John Deacon, Wimborne; Ian David Judd, Winchester; Neil Morris, Portsmouth, all of United Kingdom

[73] Assignee: International Business Machines Corporation, Armonk, N.Y.

[21] Appl. No.: 08/907,580

[22] Filed: Aug. 8, 1997

[30] Foreign Application Priority Data

Oct. 8, 1996 [GB] United Kingdom .................... 9620959

[51] Int. Cl.[7] .................................................. C06F 11/22
[52] U.S. Cl. .............................. 710/18; 710/28; 710/38; 710/131; 714/22; 714/30; 714/42; 714/43
[58] Field of Search ................................ 714/4, 22, 30, 714/43, 42; 379/26; 711/154; 710/18, 28, 38, 131

[56] References Cited

U.S. PATENT DOCUMENTS

| | | | |
|---|---|---|---|
| 3,458,661 | 7/1969 | Forde et al. ............................... | 179/15 |
| 4,035,770 | 7/1977 | Sarle ....................................... | 340/147 |
| 4,048,446 | 9/1977 | Hafner et al. ............................. | 179/15 |
| 4,159,470 | 6/1979 | Strojny et al. ............................ | 714/22 |
| 4,245,343 | 1/1981 | Frey ......................................... | 371/11 |
| 4,594,724 | 6/1986 | Hogan ..................................... | 375/7 |
| 4,704,713 | 11/1987 | Haller et al. .............................. | 370/3 |
| 4,733,391 | 3/1988 | Godbold et al. ......................... | 370/254 |
| 4,837,856 | 6/1989 | Glista, Jr. ................................. | 455/601 |
| 4,937,823 | 6/1990 | Bekki et al. .............................. | 714/4 |
| 4,956,836 | 9/1990 | Boatwright .............................. | 370/16.1 |
| 4,973,955 | 11/1990 | Avaneas .............................. | 340/825.05 |
| 5,132,962 | 7/1992 | Hobgood et al. ...................... | 370/16.1 |
| 5,218,600 | 6/1993 | Schenkyr et al. ......................... | 370/16 |
| 5,317,198 | 5/1994 | Husbands ................................. | 307/116 |
| 5,436,624 | 7/1995 | Pearce et al. ....................... | 340/825.16 |
| 5,442,623 | 8/1995 | Wu .......................................... | 370/16.1 |
| 5,448,572 | 9/1995 | Knox et al. ............................... | 714/4 |
| 5,802,258 | 9/1998 | Chen ........................................ | 714/4 |
| 5,825,850 | 10/1998 | Bren et al. ............................... | 379/26 |
| 5,841,791 | 11/1998 | Hashizume ............................. | 714/726 |
| 5,941,992 | 8/1999 | Croslin et al. ............................ | 714/4 |
| 5,948,108 | 9/1999 | Lu et al. .................................. | 714/4 |

FOREIGN PATENT DOCUMENTS

| | | |
|---|---|---|
| 0493156 | 7/1992 | European Pat. Off. . |
| 0494695 | 7/1992 | European Pat. Off. . |
| 407303116A | 11/1995 | Japan . |
| 2089176 | 6/1982 | United Kingdom . |

OTHER PUBLICATIONS

IBM Technical Disclosure Bulletin vol. 16, No. 10, Mar. 1974, 'Improved Efficiency Loop', R A Thorpe.

*Primary Examiner*—Thomas C. Lee
*Assistant Examiner*—Tammara Peyton
*Attorney, Agent, or Firm*—Esther E. Klein

[57] ABSTRACT

A data processing system comprises a host computer connected for the transfer of data to and from a plurality of data storage devices arranged in a string, the host computer including communication means comprising first and second ports connecting to first and second communication links, the first and second communication links being connected respectively to first and second data storage devices of said string. A bypassing means is provided between the first and second ports of the host system and the first and second data storage devices, the bypassing means being comprised of an independent bypass circuit on each of the first and second communication links between each of the first and second ports and the first and second data storage devices, the bypassing means being operable to bypass the host computer by connecting the first and second devices only when both of said independent bypass circuits detect a lack of data transfer on their respective links.

10 Claims, 8 Drawing Sheets

BYPASS CIRCUIT FOR BYPASSING HOST COMPUTER WHICH ARE CONNECTED TO PLURALITY OF DEVICES VIA TWO INDIVIDUAL PORTS UPON DETECTING LACK OF COMMUNICATION AT BOTH PORTS

BACKGROUND OF THE INVENTION

1. Technical Field

The present invention relates generally to the field of data processing systems and more particularly to a bypass circuit for use in such systems.

2. Description of the Related Art

The growth in computer use has created an increasing demand for flexible, high availability systems for storing data for the computer systems. Many enterprises have a multiplicity of host computer systems including personal computers and workstations that either function independently or are connected through a network. It is desirable for multiple host systems to be able to access a common pool of multiple storage systems so that the data can be readily accessed by all the host systems. Such an arrangement increases the total amount of data available to any one host system. Also, the workload can be shared among the hosts and the overall system can be protected from the failure of any one host.

In the field of data storage systems, it is known to connect one or more strings of data storage devices, e.g. disk drives, to a host system using a loop configuration. One advantage of this arrangement is that it provides dual communication paths to a selected device in the loop thus providing an aggregate loop bandwidth which can be higher than that for a single link. Furthermore, storage systems are also known which allow for connection of more than one host system to a single set of disk drives. This arrangement has the advantage that if one host system fails or is powered-down then the other host system can continue to access the data stored on the disk drives.

One result of using loop configurations is the loop can be broken by the failure or power down of one of the nodes in the loop. Such a failure results in reduced access to the remaining devices on the loop and therefore some provision needs to made to restore the loop to its original configuration. Techniques for restoring loop integrity are known but what is needed is a technique for automatically (i.e. without user intervention) restoring the loop configuration using a mechanism which does not itself compromise loop integrity.

SUMMARY OF THE INVENTION

Accordingly the present invention provides a data processing system comprising a host computer connected for transferring data to and from a plurality of data storage devices arranged in a string, the host computer including communication means comprising first and second ports connecting to first and second communication links, said first and second communication links being connected respectively to first and second data storage devices of said string; the system being characterised in that bypassing means is provided between the first and second ports of the host system and the first and second data storage devices, the bypassing means being comprised of an independent bypass circuit on each of the first and second communication links between each of the first and second ports and the first and second data storage devices, the bypassing means being operable to bypass the host computer by connecting the first and second devices when both of said independent bypass circuits detect a lack of data transfer on their respective links.

The present invention is especially useful in a data processing system wherein the host system comprises two ports connecting via two data links to a plurality of data storage devices. With a bypass circuit on each of the two links the host system can be considered to be in protected mode. That is if the host system suffers a major failure, or perhaps loses power, both bypass circuits detect the problem and switch into bypass mode. If the data processing system includes a further host system, the data storage devices are still accessible by the further host system.

It will further be appreciated that the use of a bypass circuit in accordance with the invention provides a 'self healing' network wherein resiliency is provided against the failure of a host adapter or the whole host computer. This is especially useful in high-availability networks where two or more hosts share the same data storage devices.

A preferred embodiment of the present invention will now be described, by way of example only, with reference to the accompanying drawings.

DETAILED DESCRIPTION OF THE PREFERRED EMBODIMENT OF THE INVENTION

Figure 1:
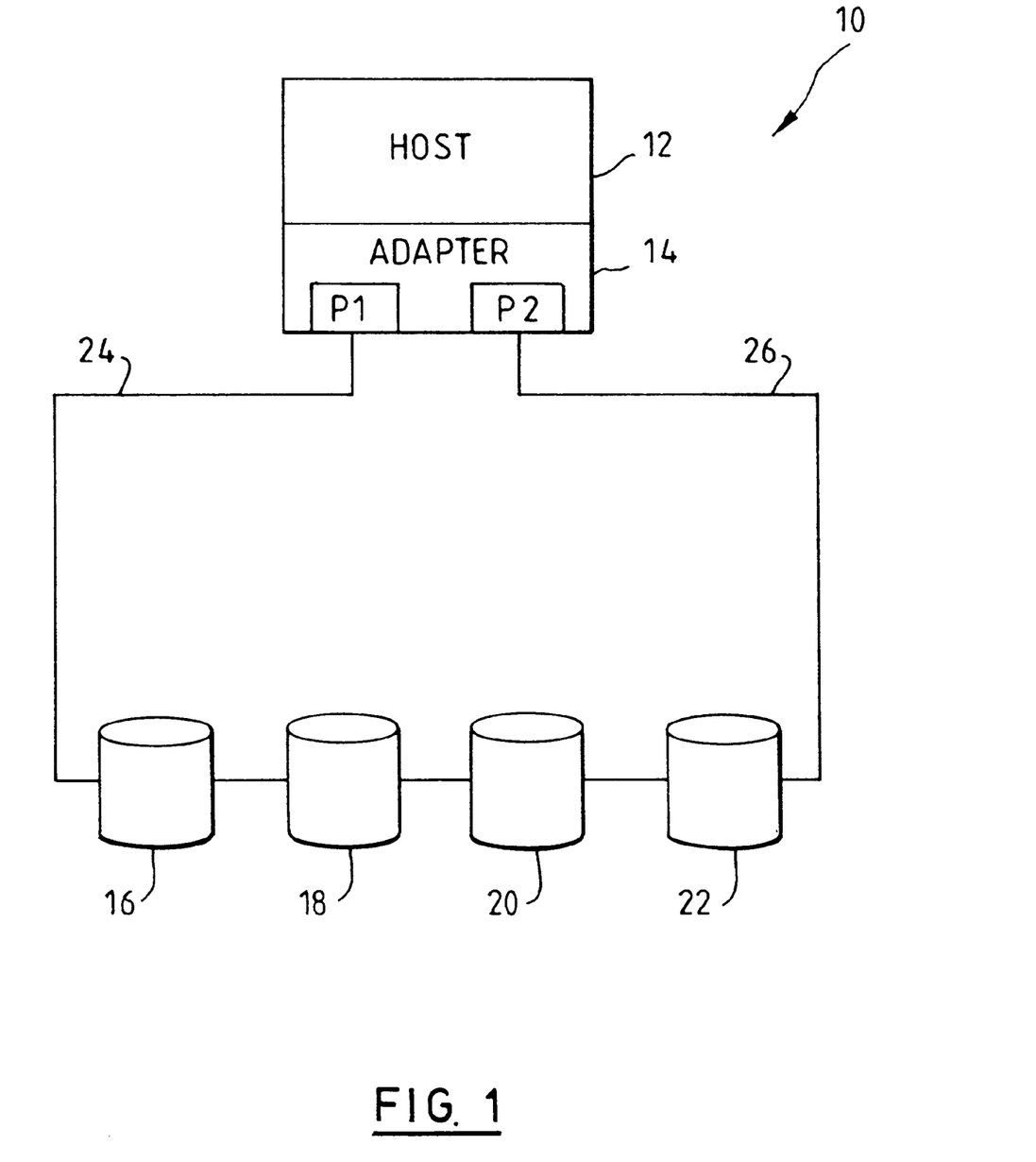
FIG. 1 is a block diagram of a data processing system including multiple disk drives connected in a loop configuration.

Referring first to FIG. 1 there is shown, in block diagrammatical form, a data processing system 10 comprising a host system 12 and associated adapter 14. The host system may be a RISC System/6000 computer under the control of the AIX operating system, both computer and operating system being available from IBM Corporation. Many other host systems could be used. The adapter connects the host for communication with a number of peripheral devices. These devices may be of various types including optical drives, printers scanners, tape drives, CD-ROMS and other similar peripherals. In the present description however, the peripheral devices are magnetic disk drives.

In the preferred embodiment, the disk drives are connected to the adapter in accordance with the Serial Storage Architecture (SSA) which is being developed by the American National Standards Institute (ANSI) X3T10.1. SSA is a serial interface specifically designed to connect I/O devices such as disk drives, tape drives, CD-ROMS etc to workstations, servers (host systems) and storage subsystems. Those skilled in the art are familiar with the implementation of the SSA architectures and therefore the architecture and its operation will not be described in detail here. For a further explanation of SSA, see "Information technology—Serial Storage Architecture—Transport Layer 1 (SSA-TL1), ANSI X3T10.1/0989D", "Information Technology—Serial Storage Architecture—Physical 1 (SSA-PH1), ANSI X3T10.1/1145D", and Information Technology—Serial Storage Architecture —SCSI-2 Protocol (SSA-S2P), ANSI X3T10.1/1121D".

In the present description, SSA provides a high speed serial link between the host system and the disk drives which as can be seen from FIG. 1 are arranged in a loop configuration thus providing for duplicate communication paths to exist from and to all nodes of the loop. Adapter 14 includes two SSA ports P1 and P2. Each port is a gateway which consists of hardware and firmware to support one end of a link (e.g. 24 or 26, each of which comprises one transmit path and one receive path). Each port is capable of carrying on two 20 Megabyte per second conversations at once, one inbound and one outbound. In the case of the adapter of FIG. 1, which is a dual port node, four simultaneous conversations may be carried out giving a total bandwidth of 80 Megabytes per second. In the present description, a node refers to a host adapter or peripheral device with one or more serial ports. The adapter is referred to as the initiator as it initiates data transfer to and from each of the disk drives.

One problem with the use of a loop configuration arises if there is a break in the loop caused by a node failing or being powered-off. If for example disk drive 18 of FIG. 1 fails or is powered-off, the communication path between port P1 and disk drive 20 is broken and thus only the communication path from port P2 is available. Similarly if there were to be a failure in one of the adapter ports, only one port would be available for communicating with the disk drives.

Figure 2:
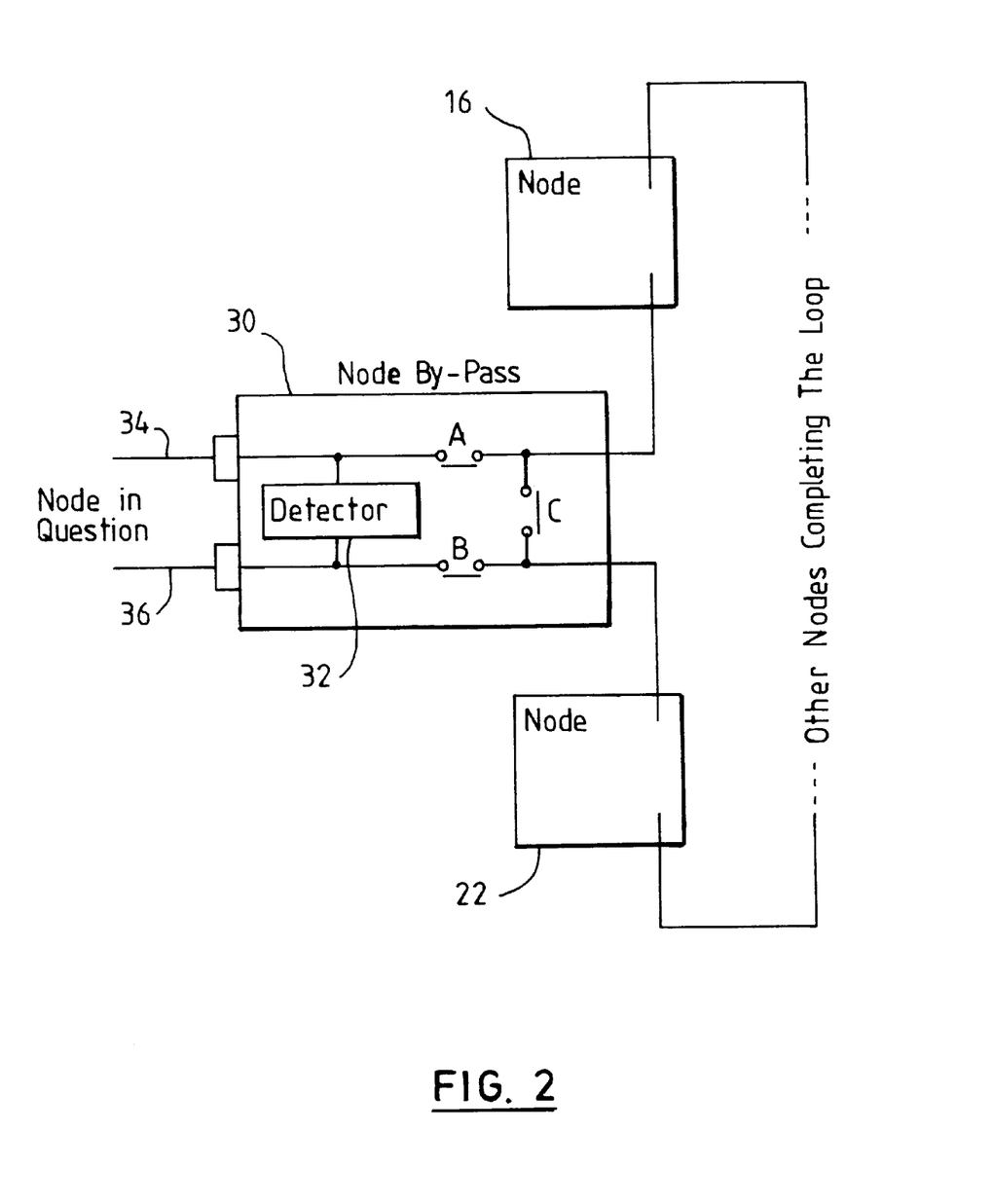
FIG. 2 shows a node by-pass circuit for connection between nodes in a data processing system.

Accordingly a node by-pass circuit is provided which sits between the node to be protected against and the SSA loop of which it is a part. FIG. 2 shows a node by-pass circuit 30 positioned between the node to be protected against and the other nodes in the loop. The by-pass circuit of FIG. 2 monitors the node in question by means of a detector circuit 32 which detects signal transitions arriving from the node at the external inputs 34,36 of the Node By-pass circuit. Detection of such signal transitions indicates that the node is operational. The detector can take the form of a frequency comparator or an average DC voltage monitor (integrator and DC comparator).

On detection of a lack of input signals on both of its external inputs for more than a predetermined time, the Node By-pass will operate to by-pass the node. The predetermined time is set to ensure that the node is not by-passed after only short periods of time where there are no signal transitions e.g. during node reset. After this predetermined time, the Node by-pass operates to break the interface between the node in question and the rest of the SSA loop by breaking the connections A and B in FIG. 2. After a predefined period of time to allow the SSA configuration to recognise that the loop is broken, the two 'broken' ends of the SSA loop are connected together (connection C in FIG. 2) thereby placing the circuit in by-pass mode.

By means of the by-pass circuit described above, the loop has been mended automatically and the node in question that was defective or powered-off is no longer part of that loop. Should the node in question subsequently be replaced or powered-up, the Node By-pass will detect the presence of input signals on either or both of its external inputs 24,36 and open the SSA loop at connection C. After a predefined period of time to allow the SSA configuration to fully recognise that the loop is broken, the connections A and B are remade to restore the SSA loop back to its original configuration.

Figure 3:
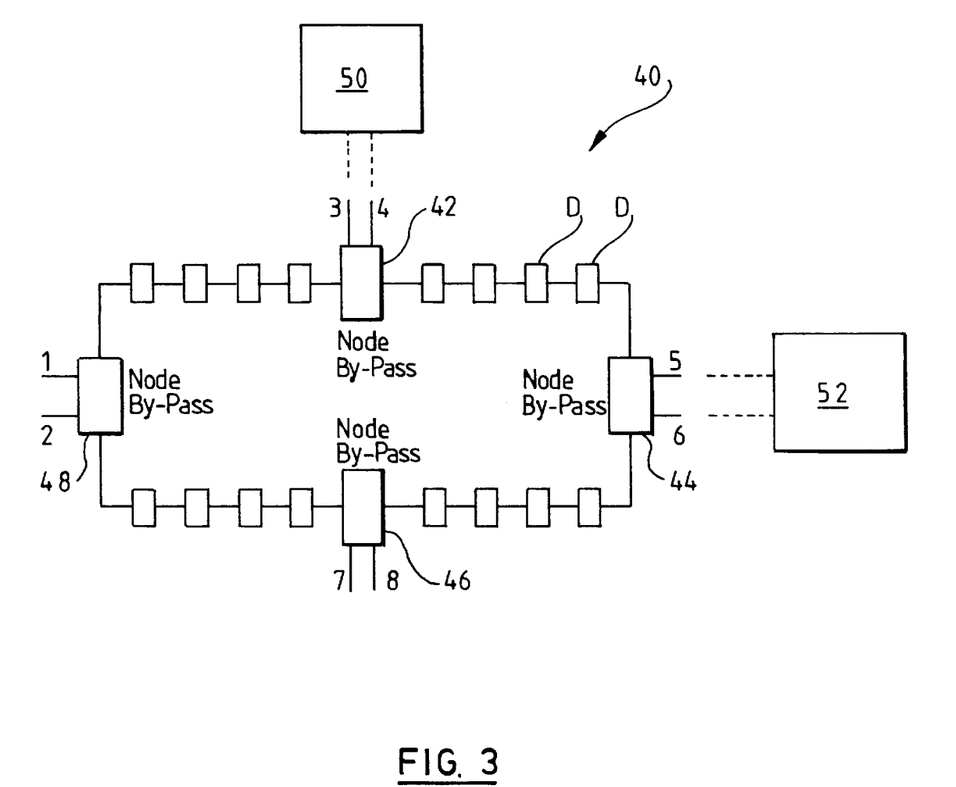
FIG. 3 shows, in schematic form, a plurality of disk drives interleaved with node bypass circuits.

In accordance with a further feature of the Serial Storage Architecture, more than one host adapter may be connected to a particular group of peripheral devices. FIG. 3 demonstrates the use of plural by-pass circuits, described in relation to FIG. 2, to achieve flexibility in configuring a data storage subsystem including a plurality of initiators. FIG. 3 shows a total of sixteen disk drives 'D' which may be contained within a common enclosure to form a data storage subsystem 40. The drives are arranged into four groups of four, interleaved with four by-pass circuits 42,44,46,48 which as will be described below results in 'self-connecting' SSA loops which require only a minimum of cables to create the required loop configuration along with the built-in by-pass protection.

Assume first that no initiators (host adapters) are connected to the storage subsystem and therefore that all the by-pass circuits are in by-pass mode. When an initiator 50 is connected to connections 3 and 4 for example, the node by-pass function detects the signal transitions on its external inputs and automatically switches into 'in-line' mode as described above, thereby forming an SSA loop with a single initiator and sixteen disk drives. As no other connections are made to any of the other connectors (e.g. 1,2,5,6,7 & 8), then the remaining three by-pass circuits 44,46,48 remain in by-pass mode.

If a second initiator 52 is added to the loop e.g. to connections 5 and 6 of node by-pass circuit 44, this circuit detects the signal transitions which will cause the circuit to switch to 'in-line' mode.

Figure 4:
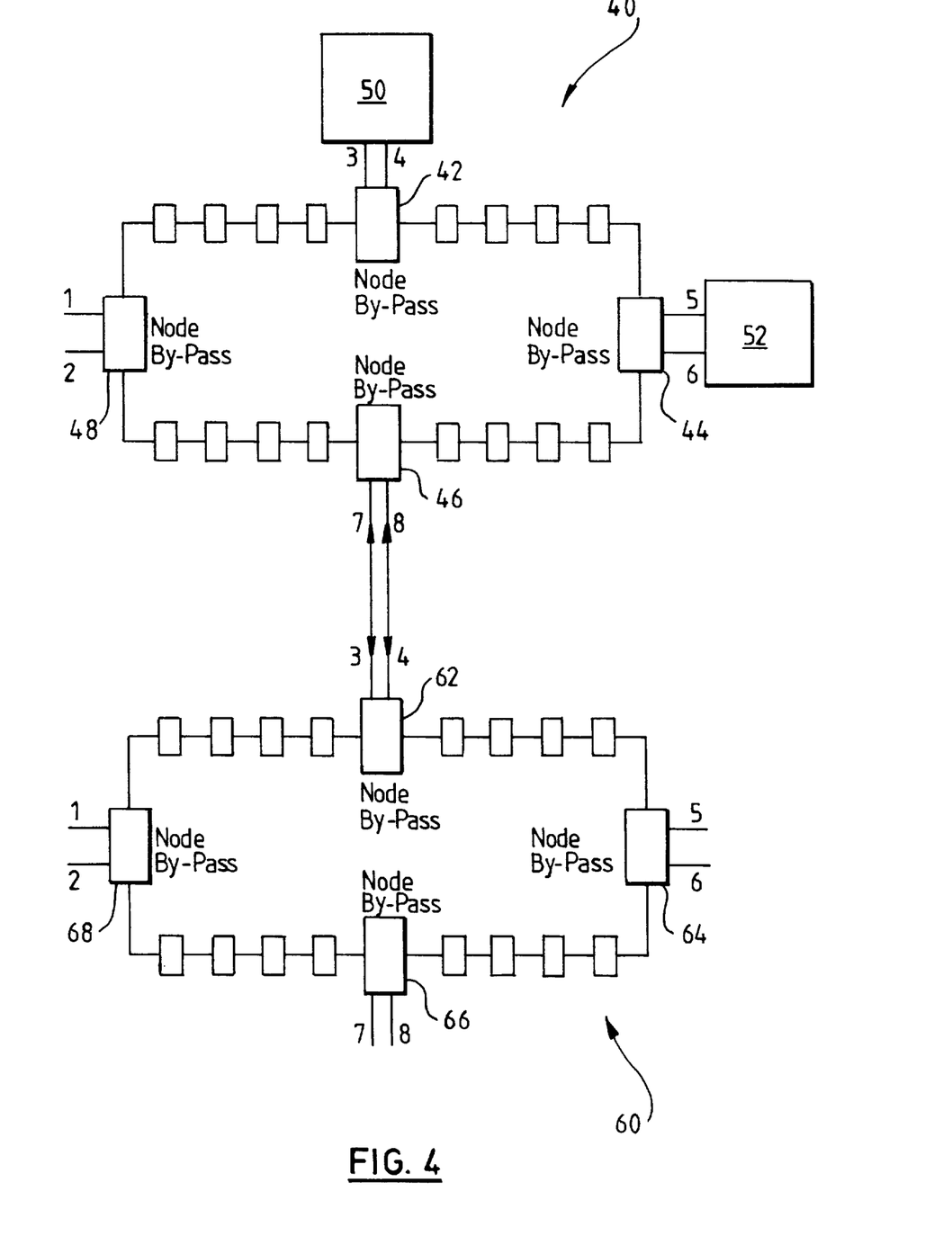
FIG. 4 shows, in schematic form, the interconnection of two loops of disk drives via two bypass circuits.

FIG. 4 shows that the by-pass circuits may be used to connect one group of disk drives 40 to a second group 60 i.e. to connect one storage enclosure to another. In FIG. 4, the connections 7 and 8 on by-pass circuit 46 of enclosure 40 are connected by cabling to connections 3 and 4 on by-pass circuit 62 of enclosure 60. On connection, both the interconnected by-pass functions detect the respective signal transitions on their external inputs and automatically switch into 'in-line' mode thereby resulting in one continuous loop of 32 nodes. With the two initiators 50,52 are connected to enclosure 40 as per the FIG. 3 arrangement, the complete system comprises two initiators connected to a total of thirty-two disk drives.

Thus has been described a by-pass circuit for use in maintaining the integrity of the SSA loop when a device fails, is disconnected or is powered-off. One potential problem with the described by-pass circuit is that the circuit itself can contribute to the problem of loop integrity. Such a circuit can have failure modes that constitute a 'single point of failure' that can cause more than two SSA links to be connected together which can cause loop segmentation i.e. devices being annexed from the loop. An improved by-pass circuit is described below which in essence is formed from two halves and which incorporates a 'physical AND' rather than a logical one to achieve its operation.

Figure 5:
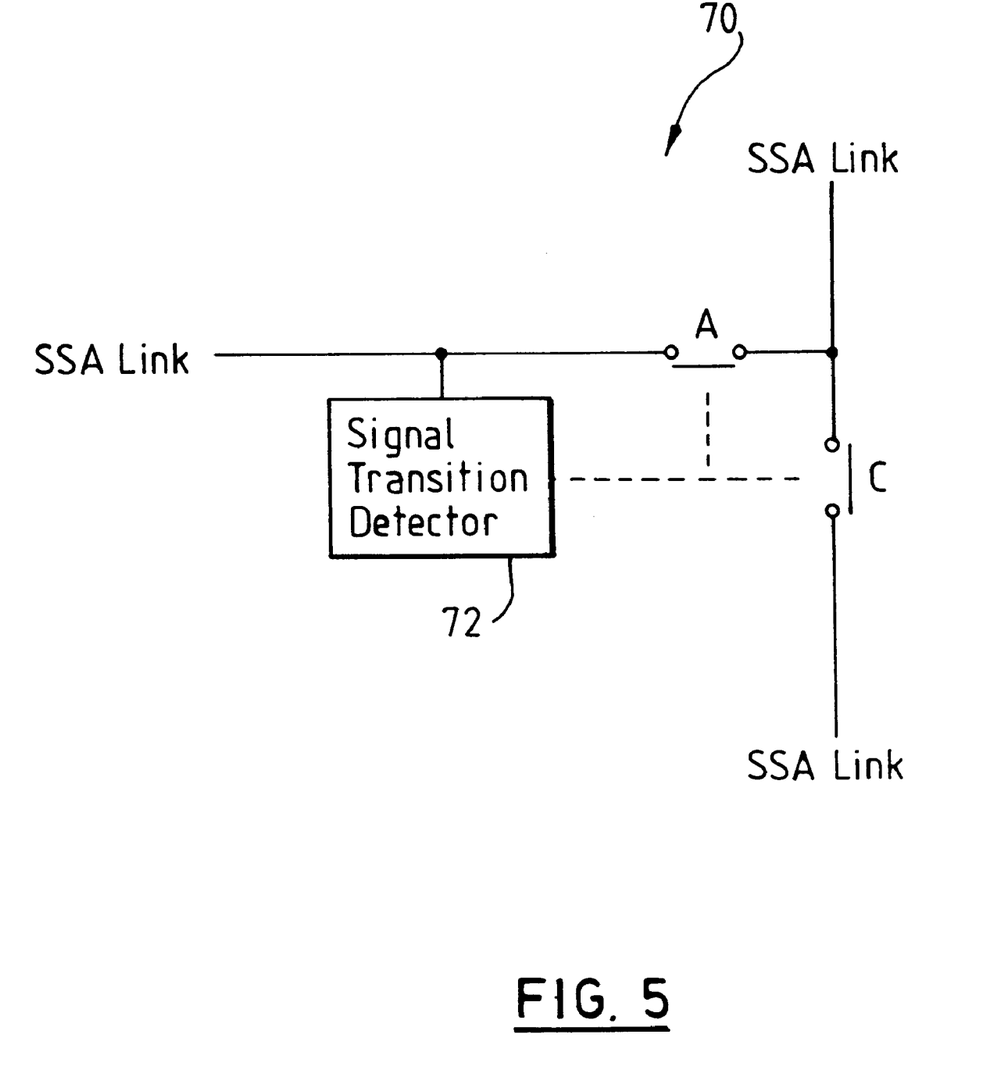
FIG. 5 shows a portion of an improved bypass circuit for connection to a serial link.

The solution to this problem is to provide a bypass circuit in the form of two totally separate and independent circuits, each performing the same function on its respective SSA link. FIG. 5 shows a schematic representation of one of these independent circuits 70 connected to one SSA link. As with the circuit of FIG. 2, the circuit of FIG. 5 detects the presence of signal transitions, by detector 72, on the connected link. On detecting the absence of transitions for a predetermined time, the circuit breaks connection A and makes connection C. Subsequent detection of signal transitions, for a predetermined time, will cause the circuit to break connection C and after a further time delay to make connection 'A' thus restoring the SSA link to its original configuration.

Figure 6:
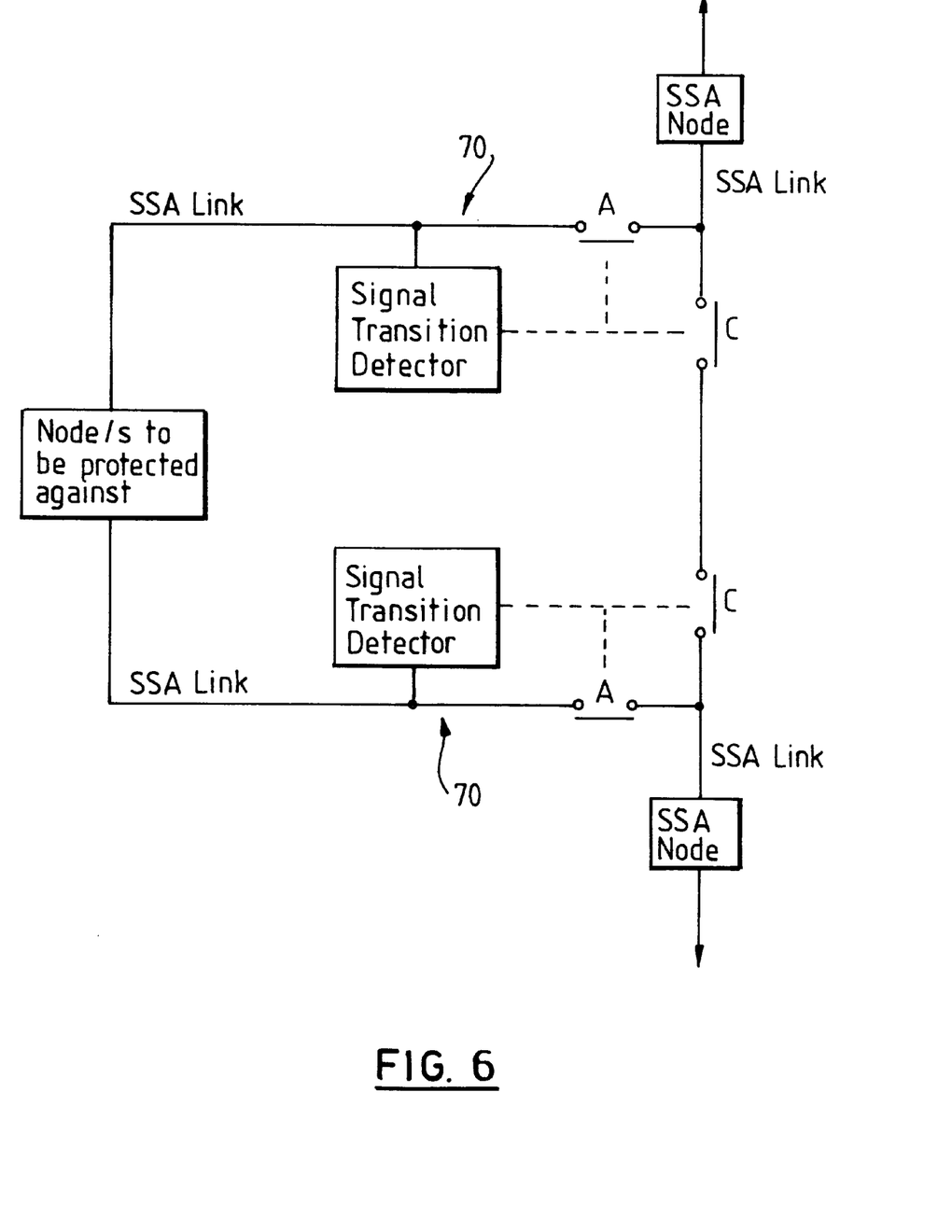
FIG. 6 shows two circuits of the type shown in FIG. 5 connected to a pair of serial links.

FIG. 6 shows the bypass circuit comprising two FIG. 5 circuits 70 connected onto respective serial links of the node to be protected against. By having both circuits 'C' connections in the same line gives the effect of a 'Physical AND' between the two circuits without there being any logical connection, thereby removing any chance of there being a single point of failure that could cause the SSA link through the C connections to be made accidentally whilst one or both of the A connections are still connected.

Figure 7:
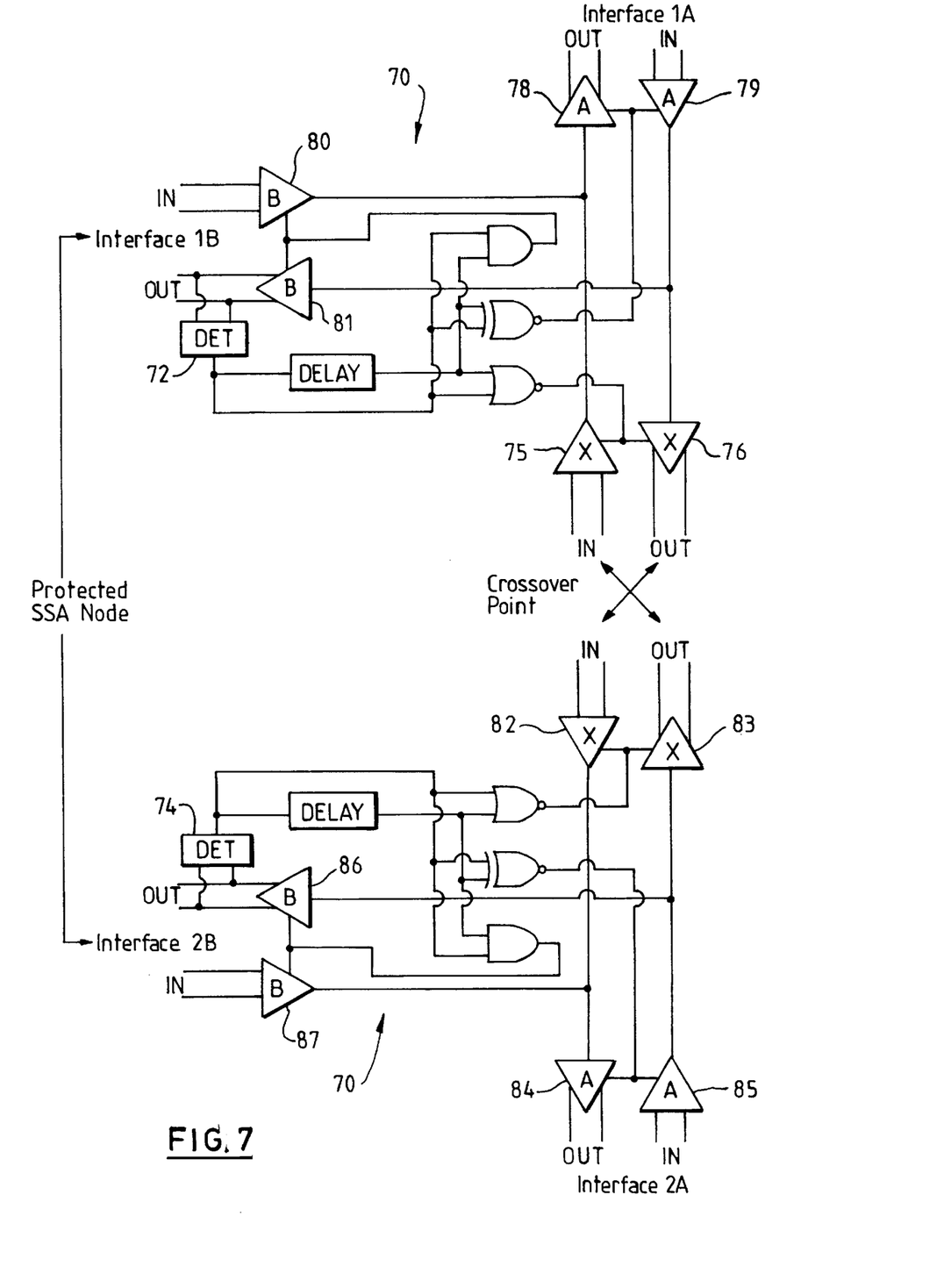
FIG. 7 is a more detailed diagram of the bypass circuit of FIG. 6.
Figure 8:
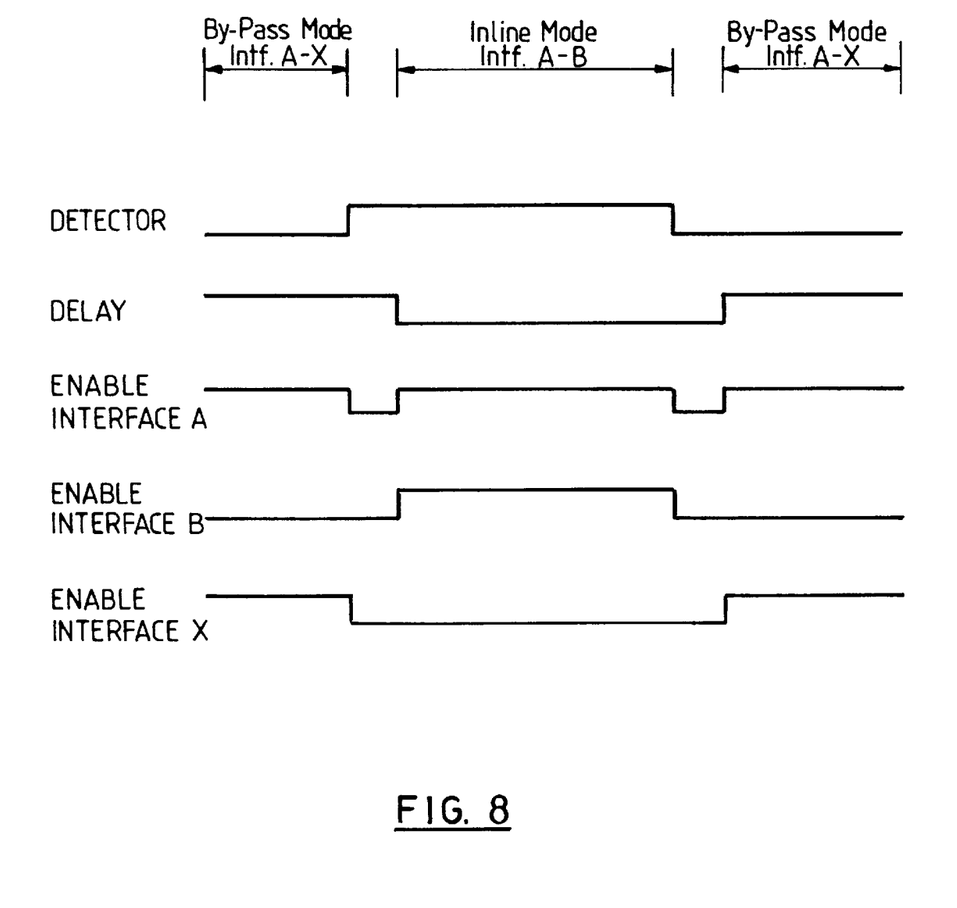
FIG. 8 is a timing diagram showing the change between inline and bypass modes of the bypass circuit of FIG. 7.

FIG. 7 shows in more detail one preferred implementation of the by-pass circuit of FIG. 6. It will however be clear that the skilled man would be readily able to construct other circuit arrangements which implement the above-described by-pass circuit functions. In a preferred embodiment, the by-pass circuits of FIG. 7 are connectable to a string of disk drives by means of interfaces 1A and 2A and to one dual port host adapter via interfaces 1B and 2B. As described above, the purpose of the by-pass circuit is to switch between bypass mode and inline mode. The circuit monitors line state and automatically switches between modes as required. The operation will be described with reference to the timing diagram of FIG. 8, beginning with the bypass mode.

The initial conditions are assumed to be that the string of disk drives are connected between interfaces 1A and 2A. Nothing is connected to interfaces 1B and 2B. In this condition, the bypass connectors sense no SSA line on interfaces 1B and 2B so the bypass circuit will connect interface 1A to interface 2A via the crossover point. Note that the crossover is required because, as in all SSA systems, a port-to-port connection requires the OUT signals to be connected to the IN signals and viceversa. Both bypass circuits remain in bypass mode until a change of line state is detected at interface 1B or interface 2B.

Each bypass circuit monitors the line state of its interface B using an SSA detector DET. At least two different methods of detection are possible: (i) detecting transitions coming in on the 'In' wires; or (ii) sensing tie-up voltage on the receivers on the 'OUT' wires. The second detection method is shown in FIG. 7. When one port of a dual port host adapter is attached to interface 1B then the detector DET 72 disables driver pair 75,76 and temporarily disables driver pair 78,79. At the end of the DELAY, driver pair 78,79 is re-enabled and driver pair 80,81 is enabled. This leaves the interface 1A connected through driver pairs 78,79 and 80,81 to interface 1B. If the second port of the dual port adapter card is connected to interface 2B then the same sequence is followed i.e. detector DET 74 disables the driver pair 82,83 and temporarily disables driver pair 84,85. At the end of the delay, driver pair 84,85 is re-enabled and driver pair 86,87 is enabled. This results in interface 2A being connected through driver pairs A and B to interface 2B. Both halves of the bypass circuit are thus in inline mode.

The purpose of the delay is to temporarily disable interface A during the change from bypass mode to inline mode or vice-versa. Devices attached to interface A thus see a temporary interruption as the circuit changes between modes. This causes a temporary break in the SSA loop, an event which is detected by all initiators on the network. The SSA initiators respond to this by walking the network to establish paths to all devices. This last process is described in European patent application EP-A-580281 entitled 'Network Addressing'.

If as described above, interfaces 1B and 2B have been connected to two ports on the same host adapter then the host adapter can be considered to be a 'protected node'. If the host adapter suffers a major failure, or perhaps loses power, both halves of the bypass circuit detect the problem and switch into bypass mode again.

It will be appreciated from the above that the use of a bypass circuit according to the invention provides a 'self-healing' network whereby resiliency is provided against the failure of a host adapter of the whole host computer. This is especially useful in high-availability networks where two or more hosts share the same disk drives and by this means, each host system or adapter cannot be a single point of failure in the network.

While the invention has been particularly shown and described with reference to the preferred embodiment, it will be understood that various changes of form and detail may be made without departing from the scope of the invention as defined by the appended claims.

We claim:

1. A communication system for a data processing system comprising a host computer connected for transferring data to and from a plurality of data storage devices arranged in a string, the communication system comprising:

first and second communication links connecting, respectively, first and second data storage devices of said string to first and second sorts in the host computer; and a bypass device provided between the first and second ports of the host system and the first and second data storage devices, the bypass device being comprised of an independent bypass circuit on each of the first and second communication links between each of the first and second ports and the first and second data storage devices, the bypass device being operable to bypass the host computer by connecting the first and second devices when both of said independent bypass circuits detect a lack of data transfer on their respective links.

2. The communication system as claimed in claim 1, wherein the first and second ports are provided within an adapter associated with the host computer.

3. The communication system as claimed in claim 1 wherein each of the independent bypass circuits comprises a detector for detecting signal transitions on their respective links.

4. The communication system as claimed in claim 1 wherein each communication link is a full-duplex serial link comprising inbound and outbound links.

5. The communication system as claimed in claim 4, wherein each independent bypass circuit detects when there is no data transfer on its serial link by sensing the tie-up voltage on receivers on its outbound link.

6. A data processing system comprising:

a host computer;

a plurality of data storage devices arranged in a string connected for transferring data to and from a communication interface associated with the host computer comprising first and second ports;

first and second communication links, said first and second communication links connecting, respectively, first and second data storage devices of said string to said first and second ports;

a bypassing device provided between the first and second ports of the host system and the first and second data storage devices, the bypassing device comprising an independent bypass circuit on each of the first and second communication links between each of the first and second ports and the first and second data storage devices, the bypassing device being operable to bypass the host computer by connecting the first and second devices when both of said independent bypass circuits detect a lack of data transfer on their respective links.

7. The data processing system as claimed in claim 6, wherein the first and second ports are provided within an adapter associated with the host computer.

8. The data processing system as claimed in claim 6, wherein each of the independent bypass circuits comprises a detector for detecting signal transitions on their respective links.

9. The data processing system as claimed in claim 6 wherein each communication link is a full-duplex serial link comprising inbound and outbound links.

10. The data processing system as claimed in claim 9, wherein each independent bypass circuit detects when there is no data transfer on its serial link by sensing the tie-up voltage on receivers on its outbound link.

* * * * *